(12) United States Patent
Henderson et al.

(10) Patent No.: US 6,404,869 B1
(45) Date of Patent: Jun. 11, 2002

(54) PREFERRED BILLING RATE PRE-PAID TELEPHONE CALLING CARD

(75) Inventors: Karl Henderson, Highland Village; James Duke Bond, Allen, both of TX (US); Charles David Ford, Brentwood, TN (US); Kamran Mir, Plano, TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/229,021

(22) Filed: Jan. 12, 1999

(51) Int. Cl.⁷ ............................................. H04M 17/00
(52) U.S. Cl. ............................ 379/144.01; 379/114.24; 379/115.02; 379/121.02
(58) Field of Search ................................ 379/207, 144, 379/112, 114, 115.02, 144.01, 114.24, 121.22; 455/405, 406

(56) References Cited

U.S. PATENT DOCUMENTS

| | | | |
|---|---|---|---|
| 3,652,795 A | 3/1972 | Wolf ........................ 179/2 DP |
| 4,439,636 A | 3/1984 | Newkirk et al. ......... 179/7.1 R |
| 4,587,379 A | 5/1986 | Kiyoshi et al. ........... 179/2 CA |
| 4,706,275 A | 11/1987 | Kamil et al. ................. 379/144 |
| 4,776,000 A | 10/1988 | Raoul et al. .................... 379/62 |
| 4,877,947 A | 10/1989 | Toru et al. .................... 235/381 |
| 4,879,794 A | 11/1989 | Djerf et al. .................. 29/159.1 |
| 4,951,308 A | 8/1990 | Barraud et al. ................. 379/91 |
| 5,086,457 A | 2/1992 | Barraud et al. ............... 379/144 |
| 5,101,098 A | 3/1992 | Naito et al. ................... 235/475 |
| 5,146,067 A | 9/1992 | Sloan et al. .................. 235/381 |
| 5,155,342 A | 10/1992 | Takayoshi et al. .......... 235/380 |
| 5,163,086 A | 11/1992 | Neustein et al. ............... 379/91 |
| 5,192,947 A | 3/1993 | Nishimura et al. ......... 340/825 |
| 5,225,666 A | 7/1993 | Amarena et al. ............ 235/476 |

(List continued on next page.)

FOREIGN PATENT DOCUMENTS

| | | | |
|---|---|---|---|
| EP | 0406841 A1 | 4/1990 | ........................ 7/8 |
| FR | 2 575 016 | 12/1984 | ..................... 17/2 |
| GB | 2151061 A | 7/1985 | ........................ 7/8 |
| GB | 2215897 A | 9/1989 | ........................ 7/8 |
| JP | 62-54623 | 3/1987 | ........................ 1/6 |
| JP | 62-266960 | 11/1987 | |
| JP | 2-61786 | 3/1990 | ..................... 15/30 |
| JP | 2-79193 | 3/1990 | ........................ 7/8 |
| JP | 2-245893 | 10/1990 | ..................... 1/12 |
| JP | 3-24684 | 2/1991 | ........................ 7/8 |
| JP | 3-62296 | 3/1991 | ........................ 7/8 |
| JP | 4-1891 | 1/1992 | ..................... 1/12 |
| JP | 4-43493 | 2/1992 | ..................... 1/12 |
| JP | 4-140896 | 5/1992 | ........................ 7/8 |
| JP | 4-354092 | 12/1992 | |
| JP | 6-121075 | 4/1994 | ..................... 7/26 |

*Primary Examiner*—Binh Tieu
*Assistant Examiner*—Barry W Taylor

(57) ABSTRACT

System and a method for facilitating the use of a preferred, discount rate pre-paid telephone calling card. The system and method include and involved a data storage system for storing data corresponding to a pre-paid telephone calling card and at least one location identifier related to the pre-paid telephone calling card. The location identifier(s) corresponding to at least one telephone call service rate. The system and method also include and involve a pre-paid telephone calling card processing system that is coupled to the data storage system and which is configured to receive the location identifier(s) during a setup call over a telephone network and to cause the location identifier(s) to be stored in the data storage system during the setup call. During an access telephone call, such as one in which an outbound telephone call may be made in accordance with a pre-paid telephone calling card to a terminating telephone number based on at least one location identifier, a calling party may realize preferred, discounted telephone service rates. Such rates may be used to bill calls against available call usage units, etc. based on a selected location identifier.

26 Claims, 15 Drawing Sheets

U.S. PATENT DOCUMENTS

| | | | | |
|---|---|---|---|---|
| 5,226,073 A | | 7/1993 | Albal et al. | 379/91 |
| 5,264,689 A | | 11/1993 | Albal et al. | 235/492 |
| 5,266,782 A | | 11/1993 | Alanara et al. | 235/380 |
| 5,266,785 A | | 11/1993 | Sugihara et al. | 235/384 |
| 5,327,482 A | | 7/1994 | Kazuo et al. | 379/61 |
| 5,352,876 A | | 10/1994 | Wannabe et al. | 235/381 |
| 5,359,182 A | | 10/1994 | Schilling et al. | 235/380 |
| 5,359,642 A | | 10/1994 | Castro et al. | 379/121 |
| 5,381,467 A | * | 1/1995 | Rosinski et al. | 379/121 |
| 5,408,519 A | | 4/1995 | Pierce et al. | 379/67 |
| 5,409,092 A | | 4/1995 | Itako et al. | 194/210 |
| 5,450,477 A | | 9/1995 | Amavant et al. | 379/93 |
| 5,477,038 A | | 12/1995 | Levine et al. | 235/380 |
| 5,504,808 A | | 4/1996 | Hamrick, Jr. | 379/144 |
| 5,511,114 A | | 4/1996 | Stimson et al. | 379/114 |
| 5,577,109 A | | 11/1996 | Stimson et al. | 379/112 |
| 5,621,787 A | | 4/1997 | Harmick et al. | 379/144 |
| 5,666,405 A | * | 9/1997 | Weber | 379/127 |
| 5,721,768 A | | 2/1998 | Stimson et al. | 379/114 |
| 5,758,288 A | * | 5/1998 | Dunn et al. | 455/456 |
| 5,825,863 A | * | 10/1998 | Walker | 379/144 |
| 5,845,205 A | * | 12/1998 | Alanara et al. | 455/564 |
| 5,953,398 A | * | 9/1999 | Hill | 379/112 |

* cited by examiner

PREFERRED BILLING RATE PRE-PAID TELEPHONE CALLING CARD

BACKGROUND OF THE INVENTION

1. Field of the Invention

The present invention relates to systems and methods that are used to facilitate enhanced services related to pre-paid telephone calling cards.

2. Description of the Related Art

It is well known that pre-paid telephone calling cards have become widely used to obtain telephone calling services such as long distance calling services, etc. Consumers can purchase prepaid cards from retail stores and use the same to obtain access to telephone services to call friends and family all over the world. As such, many different kinds of pre-paid telephone calling cards are now available. Consumers can purchase pre-paid telephone calling cards having a variety of calling options (domestic calling options, international calling options, etc.) and a wide selection of pre-paid values. For example, consumers can purchase domestic-use calling cards that are charged with 100 domestic call units (i.e., a unit is typically equal to one telephone service minute, but may be associated with some other amount of time— e.g., 50 seconds, etc.).

The appeal of pre-paid cards to consumers is due in large part to the fact that pre-paid telephone calling cards often allow consumers to realize savings associated with making telephone calls. For example, pre-paid telephone calling cards often allow consumers to avoid the costs associated with using a conventional telephone calling card that is associated with a particular telephone line (e.g., an access call service charge that is added to other toll-call rates and charges). As a result of their appeal, many retailers have begun to offer and sell pre-paid cards. Since a relatively large selection of pre-paid telephone calling cards can be stocked and displayed without requiring significant retail floor space, retailers can enjoy maximized revenues relative to small sections of their leased or owned storefronts.

Despite the appeal of pre-paid cards to both consumers and retailers, such market acceptance has created serious problems for providers of pre-paid cards and related telephone services. In particular, providers of pre-paid cards have been forced to distinguish their products in order to effectively compete. To date, the only effective way to distinguish one's pre-paid cards has been to continuously lower telephone service rates to the point of extremely thin or negative margins. And, unfortunately, pre-paid cards that promise the "lowest" telephone service rates often are not sufficient to capture and retain pre-paid card customers.

Thus, there exists a need to provide systems and methods that will allow providers of pre-paid cards to offer enhanced services in relation to their pre-paid cards without requiring providers to lower their telephone service rates to unreasonable levels. To be viable, such systems and methods must allow users of pre-paid cards to easily take advantage of such enhanced services while, at the same time, using pre-paid cards to obtain conventional telephone calling services.

SUMMARY OF THE INVENTION

The present invention solves the above-described problems associated with prior pre-paid telephone calling cards by providing systems and methods that facilitate the provisioning, processing, and use of enhanced services in relation to pre-paid telephone calling cards.

By providing such systems and methods, providers of pre-paid telephone calling cards will be able to effectively compete in the pre-paid card marketplace by offering better, more feature-rich services on which consumers will rely on and come to enjoy. In particular, such systems and methods may be used to provide enhanced services to card purchasers who wish to obtain reduced telephone service rates to a selected country or location. In accordance with the present invention, a pre-paid card customer may purchase a pre-paid card and, upon first use of the pre-paid card for example, specify a country for which he would like to receive particular or special discounts on calls made into that country.

In accordance with the present invention, provided is a system and a method for facilitating the use of a preferred, discount rate pre-paid telephone calling card. The system and method include a data storage system for storing data corresponding to a pre-paid telephone calling card and at least one location identifier related to the pre-paid telephone calling card; the location identifier(s) corresponding to at least one telephone call service rate. The system and method also include and involve a pre-paid telephone calling card processing system that is coupled to the data storage system and which is configured to receive the location identifier(s) during a setup call over a telephone network and to cause the location identifier(s) to be stored in the data storage system during the setup call. During an access telephone call, such as one initiated to place an outbound pre-paid card telephone call to a terminating telephone number based on at least location identifier, a calling party may realize preferred, discounted telephone service rates.

BRIEF DESCRIPTION OF THE DRAWINGS

The present invention is described in detail below with reference to the following drawing figures, of which.

DETAILED DESCRIPTION OF THE PREFERRED EMBODIMENTS

The present invention is now discussed in detail with reference to the figures that were briefly described above. An overview section is followed by a discussion of the structural aspects of the present invention and a discussion of corresponding data and call flows.

Overview

The present invention is concerned with providing systems and methods that may be used to provide enhanced pre-paid telephone calling card services and features. Such enhanced services and features include and involve systems and methods that are provided by the present invention to deliver pre-paid telephone calling cards (hereinafter "pre-paid cards") that may be used to obtain preferred telephone call services at corresponding telephone call service rates (e.g., money per unit of telephone service time, etc.) for particularly selected and specified locations (e.g., geographic locations such as countries, states, etc., telephone numbers such as particular terminating telephone number, etc.). With such enhanced pre-paid cards and related services, people will be able to obtain reduced telephone call service rates for telephone calls to particular locations such as for international telephone calls. Accordingly, the present invention provides a type of "most-favored nation" type of pre-paid card which will allow a card purchaser to specify a particular country to which reduced, discounted rate pre-paid telephone calling card based telephone calls may be made.

More particularly, the present invention will allow data stored in relation to a particular pre-paid card to include or point to at least one location identifier to which reduced telephone call service rates may be realized. Such data may be affected in accordance with the present invention during a call made in accordance with a particular pre-paid card (e.g., during a first call—i.e., a location identifier setup call, etc.). For example, the present invention will allow a purchaser of a pre-paid card ("card purchaser") to select and specify at least one location identifier and then use the pre-paid card to make telephone calls into a particular location (e.g., country, etc.) and receive preferred, reduced service rates for such calls. Such reduced rates into particular counties may be published on packaging related to a pre-paid card, etc. Such reduced rates into a particular location, for example, may represent a discount of say 50% off typical charges.

Figure 1:
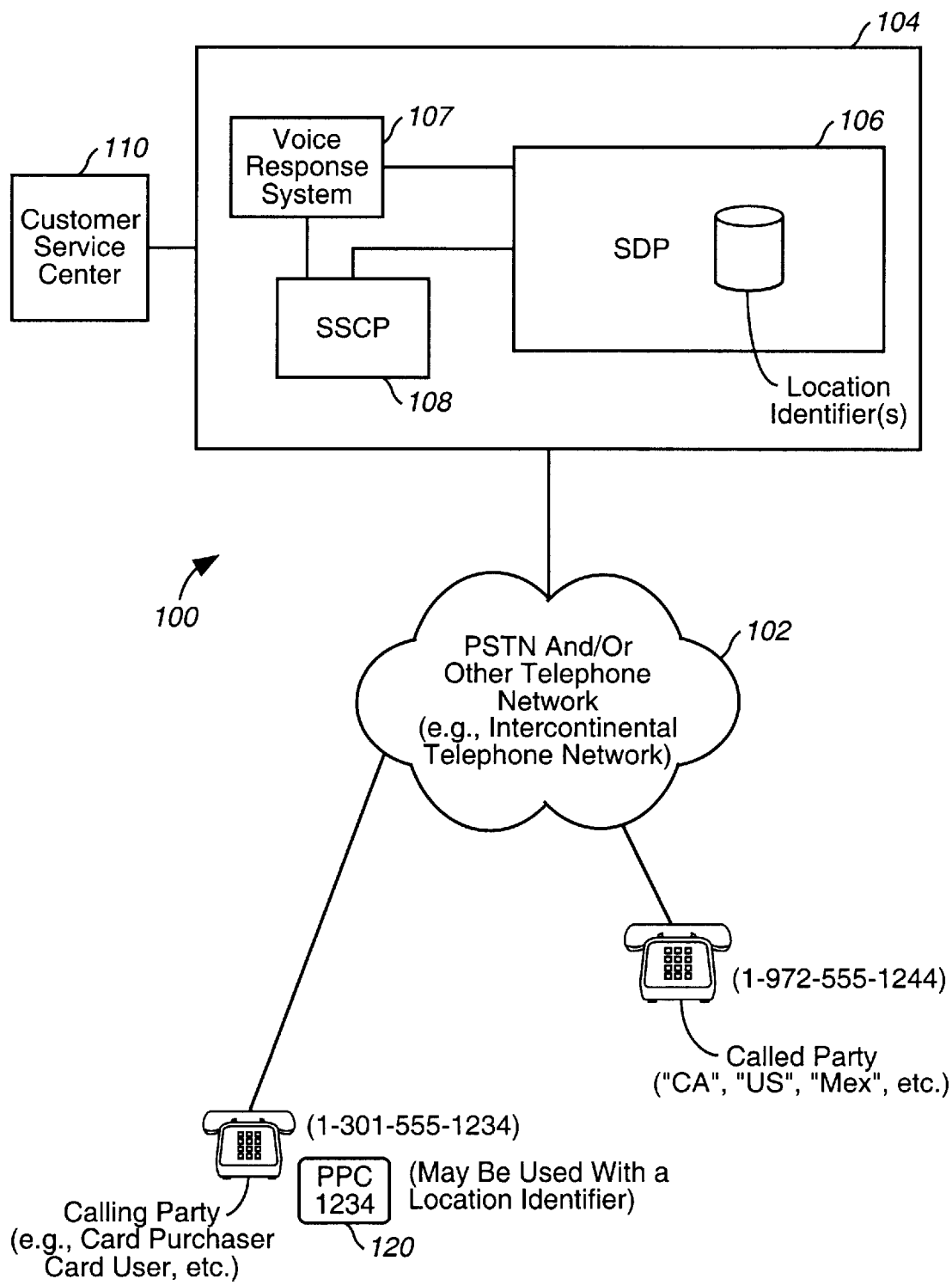
FIG. 1 is a diagram of a system in which enhanced services may be provided in conjunction with pre-paid calling cards according to a preferred embodiment of the present invention.

To facilitate the provisioning of a pre-paid card that is to have an associated list with at least one location identifier, the present invention includes two phases of operation that are discussed in detail below with regard to FIGS. 1 and 2A–2N. A first phase involves pre-paid card activation and feature setup, while a second phase includes card use. The first phase, prepaid card activation and feature setup, may involve the actions of a seller of pre-paid cards in conjunction with the actions of a card purchaser. Pre-paid card feature setup involves the actions of a card purchaser who, by way of the present invention, is now able to initiate a setup call to a pre-paid card processing system to specify at least one location identifier corresponding to at least one location for which preferred, reduced telephone call service rates may be realized. In accordance with the present invention, the location identifier specified by a card purchaser may be set or changed any number of times, but preferably, may be set once during an initial setup call.

The aforementioned second phase, card use, may involve the actions of the card purchaser or other party (e.g., a card user, etc.) who seeks to make a telephone call through use of a prepaid card (or someone who seeks to receive the benefit of some other pre-paid card related service—e.g., pre-paid network service such as pre-paid Internet access, pre-paid cellular service, etc.). A card user, now may realize preferred telephone call service rates upon use (e.g., upon a first use telephone call—a telephone service access call, etc) of the pre-paid card.

Structural Aspects of the Present Invention

To deliver the aforementioned enhanced services/features and, in particular, the ability to store at least one location identifier such as a country code, special-use telephone number (e.g., a home telephone number, etc.), etc. to realize corresponding preferred, discount telephone call service rates, the present invention utilizes systems and corresponding processes described herein. In particular, the structural aspects of the present invention are described with reference to FIG. 1. Depicted in FIG. 1 is a system 100 which supports enhanced pre-paid cards such as those that may be set up to have associated location identifiers. In particular, system 100 includes a calling party (e.g., having telephone number 301-993-1234), a called party (e.g., having telephone number 972-918-1244 and which may be associated with a location identifier such as a country code "US" for the United States, "CA" or "CAN" for Canada, "MEX" for Mexico, etc.), the publicly switched telephone network (PSTN) 102 and/or other telephony network including, but not limited to, an intercontinental telephone network, the Internet, etc., a pre-paid telephone calling card processing system 104, such as one including at least one intelligent network platform having one or more service data points (SDP) 106, at least one service switching control point (SSCP) 108, and a customer service center 110, which may be attended by live operators. In FIG. 1, calling party (e.g., a card purchaser, card user, etc.) may use a prepaid card 120 to obtain enhanced pre-paid telephone calling card services (such as telephone call services to a particular location such as calls terminating in a particular country, etc.) at reduced or discounted rates, which may be less than normally charged and other reduced telephone service rates.

Also included within pre-paid telephone calling card processing system 104 is a voice response system 107 that may be used to automatically voice prompts and/or recorded messages/personal greetings via a telephone call (e.g., a setup call, during which one or more location identifiers may be received and recorded automatically, etc.) over a telephone network, such as the PSTN 102. The use of such voice response systems will be readily apparent and understood by those skilled in the art. The use of a voice response system to facilitate voicing of digitally recorded voice sequences, such as prompts for information and data entry, will be readily understood by those skilled in the art.

System 100 facilitates both card feature setup by a card purchaser and card use by a card user. A pre-paid card, such as pre-paid card 120, may be used to obtain long-distance telephone service or other services that may be offered in conjunction with a pre-paid type card (e.g., pre-paid Internet service, pre-paid cellular telephone service, etc.).

As noted above, pre-paid telephone calling card processing system 104 is one that includes at least one intelligent network platform consisting of, among other things, one or more SSPs and one or more SCPs (which may be implemented in a common structure referred to herein as an SSCP) 108 and SDP 106. As such, a card purchaser of pre-paid card 120 may access SSCP 108 via PSTN 102 to affect database records related to pre-paid cards like or similar to the pre-paid card 120. It should also be noted that the present invention utilizes the functionality of, among other things, Service Data points (SDPs), Service Control points (SCP's) Service Switching points (SSPs), etc. The actual configuration and arrangement of structures within an intelligent network platform to deliver and provide such functionality may vary depending on available products and systems.

A card purchaser may setup pre-paid card 120 by causing one or more location identifiers to be stored in a database storage facility, such as within SDP 106 during a first use of the pre-paid card (e.g., during a first use setup telephone call). Data related to pre-paid card 120 may be stored in SDP 106. Such data may include card usage data, such as remaining minutes, unit billing rates, and location identifier(s) corresponding to geographic locations, telephone numbers (e.g., special use telephone numbers like a home telephone number, :etc.) along with reduced billing rates. Location identifiers can be made to correspond to special, preferred, and discount telephone service rates that may be used by downstream systems to facilitate call billing processes, which will be readily understood by those skilled in the art. Such telephone service rates may be reduced rates that are less than normal rates charged for pre-paid card based calls to locations specified by a particular location identifier. Such location identifiers may take any form, such as a string of characters corresponding to a country code, state code, telephone number, etc. that may be entered, for example, via telephone keypad (DTMF) data entry, speaker-independent voice recognition, etc. For example, a location identifier may be "CAN" as entered via telephone device keypad as the corresponding number sequence of "226" etc. Once at least one location identifier is stored in relation to a pre-paid card, a calling party or card user may realize reduced-rate pre-paid card calls to corresponding locations (e.g., countries, telephone numbers, etc.). Such reduced rates may reflect any percentage discount (e.g., 20%, etc.) over normal pre-paid card rates such as pre-paid international calling rates.

A card purchaser of pre-paid card 120 may cause data related to pre-paid card 120 to be affected via a live operator session handled through customer service center 110. The facilities to support use of a customer service call center, to ultimately support pre-paid cards, will be readily apparent to those skilled in the art.

Once pre-paid card 120 has been setup in accordance with the present invention (e.g., caused to be associated with at least one location identifier), a card user may place a pre-paid card call in a conventional way (e.g., by dialing a 1-800 access number and entering an appropriate card identity (such as a PIN/CARD ID number) to obtain long distance telephone service, etc. In accordance with the present invention, however, the card user may realize reduced or discounted telephone service rates in relation to calls made to a particular location based on and/or in accordance with a location identifier.

A telephone call desired by a calling party (e.g., by a card user) may be placed from a calling party station, such as one having telephone number 301-993-1234, to a called party in a particular location (e.g., country, state, etc.) having a telephone terminal station identified at telephone number 972-918-1244.

Pre-paid Card Activation, Feature Setup and Card Use

The structural aspects of the present invention, which are described above and as shown in FIG. 1, are designed to operate together to facilitate the phases of operation that were discussed in the OVERVIEW section hereof. In particular, the structures depicted in FIG. 1 which make up system 100 are configured to support both pre-paid card activation and feature set-up as a first phase of operation and card use as a second phase of operation. Pre-paid card activation involves the operations related to data stored for pre-paid card 120 that may be stored in SDP 106 (FIG. 1). Such activation operations, include, but are not limited to, card activation, deactivation, re-charge of remaining minutes, etc. and in particular, point-of-sale activation of the same, are intended to place a pre-paid card like pre-paid card 120 into an active, ready-for use state (e.g., ready to be used to make telephone calls in relation thereto, etc.). Pre-paid card activation may occur via a point-of-sale (POS) operation, a telephone session with a live operator, etc. An exemplary system to provide for activation operations related to pre-paid calling cards and is shown in co-pending U.S. patent application Ser. No. 09/089,815, filed on Jun. 4, 1998, entitled "POINT OF SALE ACTIVATION AND DEACTIVATION OF PRE-PAID TELEPHONE CALLING CARDS," which is commonly assigned and incorporated herein by reference. The systems and call flows illustrated within the aforementioned, co-pending United States Patent Application may be used to activate and deactivate (and otherwise affect data stored within SDP 106) to render a particular pre-paid card, such as pre-paid card 120, ready-for-use (e.g. ready to be used to make pre-paid card telephone calls, such as long distance telephone calls) by a card user. And, in particular, such activation systems and call flows may be used to ready a card for use by a card user in accordance with the present invention.

After a card has been activated as described above, card features may be setup in accordance with the present invention. In particular, a pre-paid card may be setup during a first use (e.g., during a setup call, etc.) by causing at least one location identifier to be stored in relation to data stored in SDP 106, for example, for a pre-paid card such as pre-paid card 120. Upon use in accordance with a use phase related to the present invention, such a location identifier may be referenced as a selected location for which to receive preferred, discounted telephone service rates.

Figure 2A:
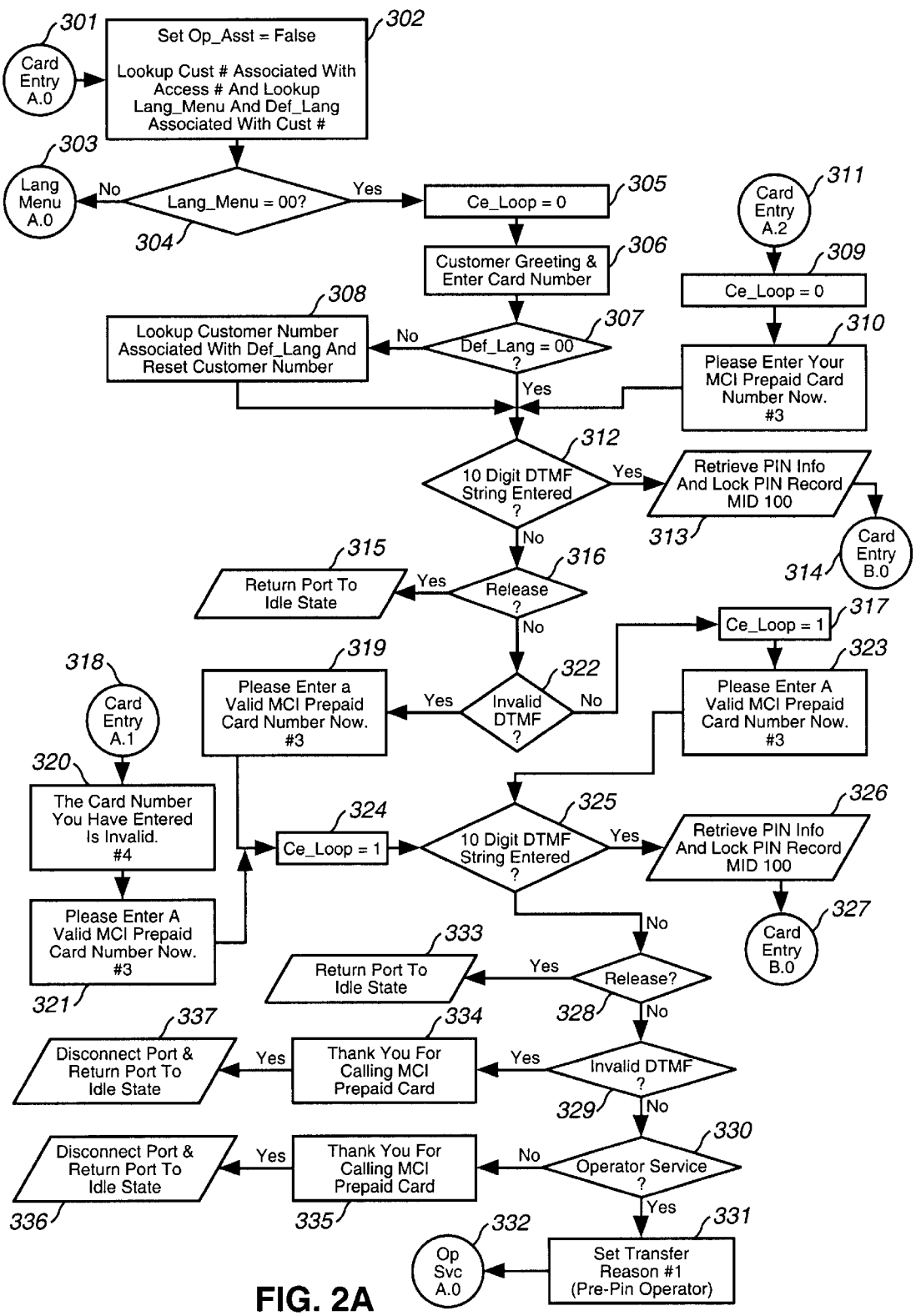
FIG. 2A is a call flow diagram that illustrates the operations carried out within the system depicted in FIG. 1 to allow use of a pre-paid telephone calling card and, in particular, one which may be used in conjunction with a stored location identifier to realize preferred, discount telephone service rates.
Figure 2B:
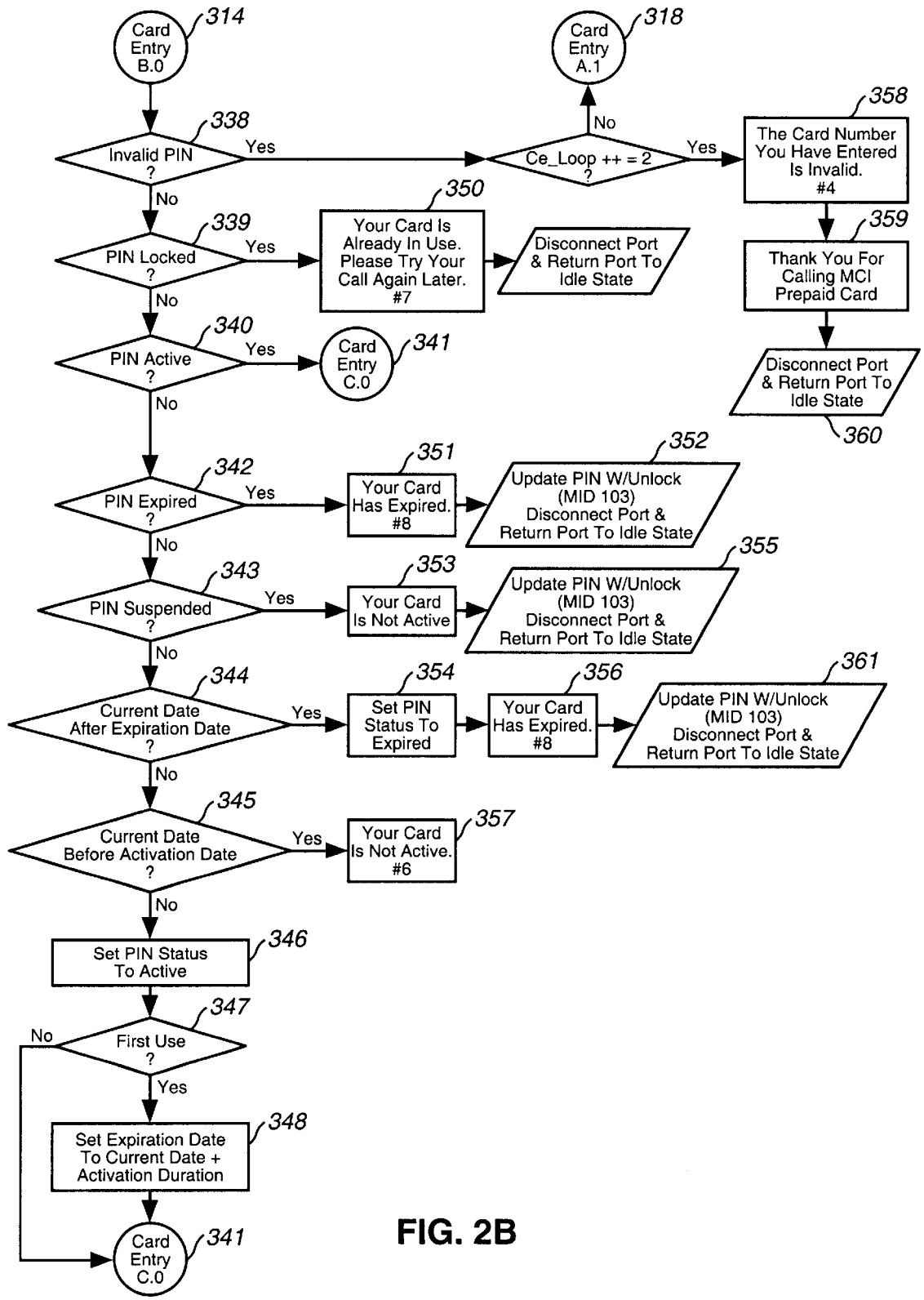
FIG. 2B is a continuation call flow diagram of the call flow diagram started in FIG. 2A.
Figure 2C:
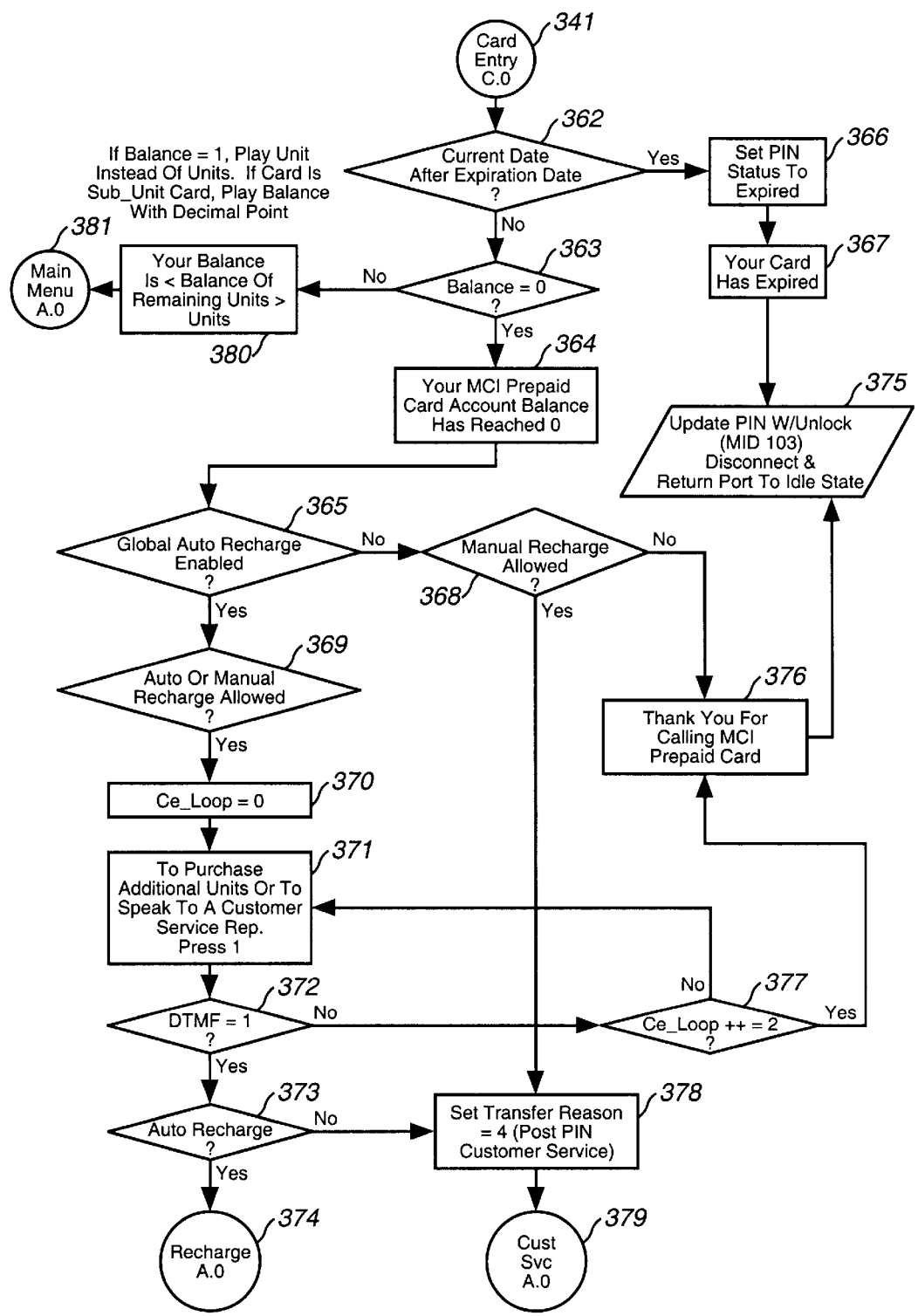
FIG. 2C is a continuation call flow:diagram of the call flow diagram started in FIGS. 2A and 2B.
Figure 2D:
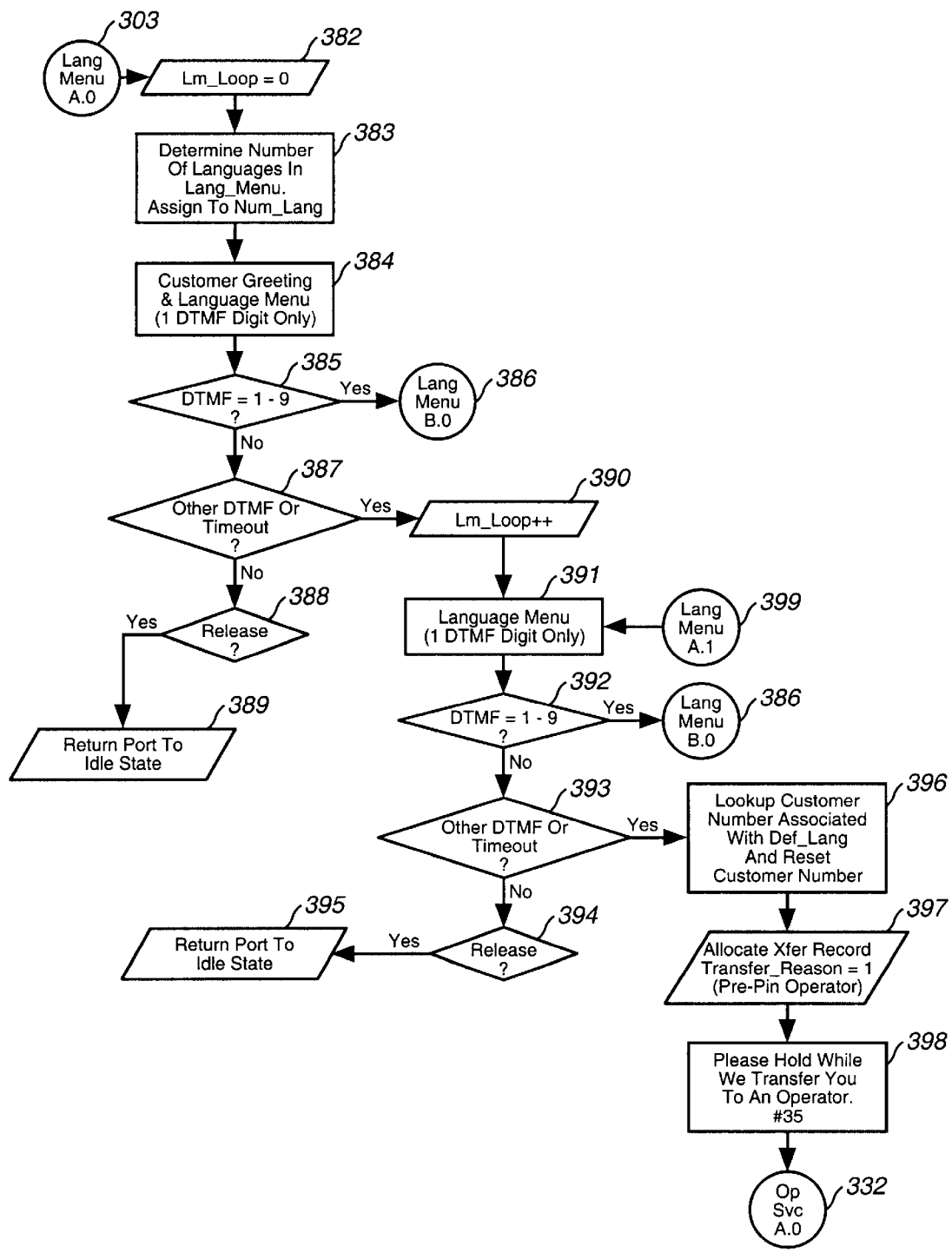
FIG. 2D is a continuation call flow diagram of the call flow diagram started in FIGS. 2A–2C.
Figure 2E:
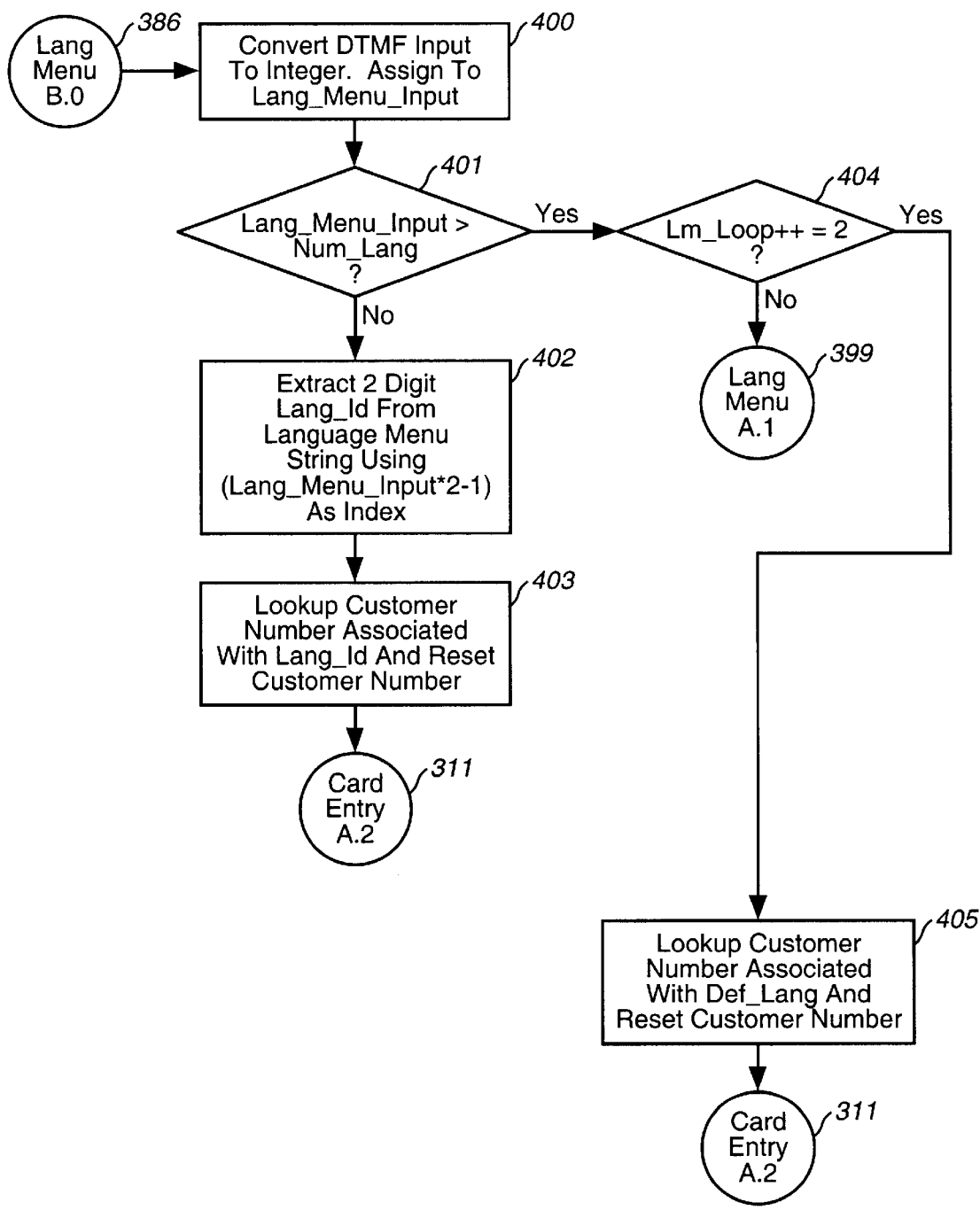
FIG. 2E is a continuation call flow diagram of the call flow diagram started in FIGS. 2A–2D.
Figure 2F:
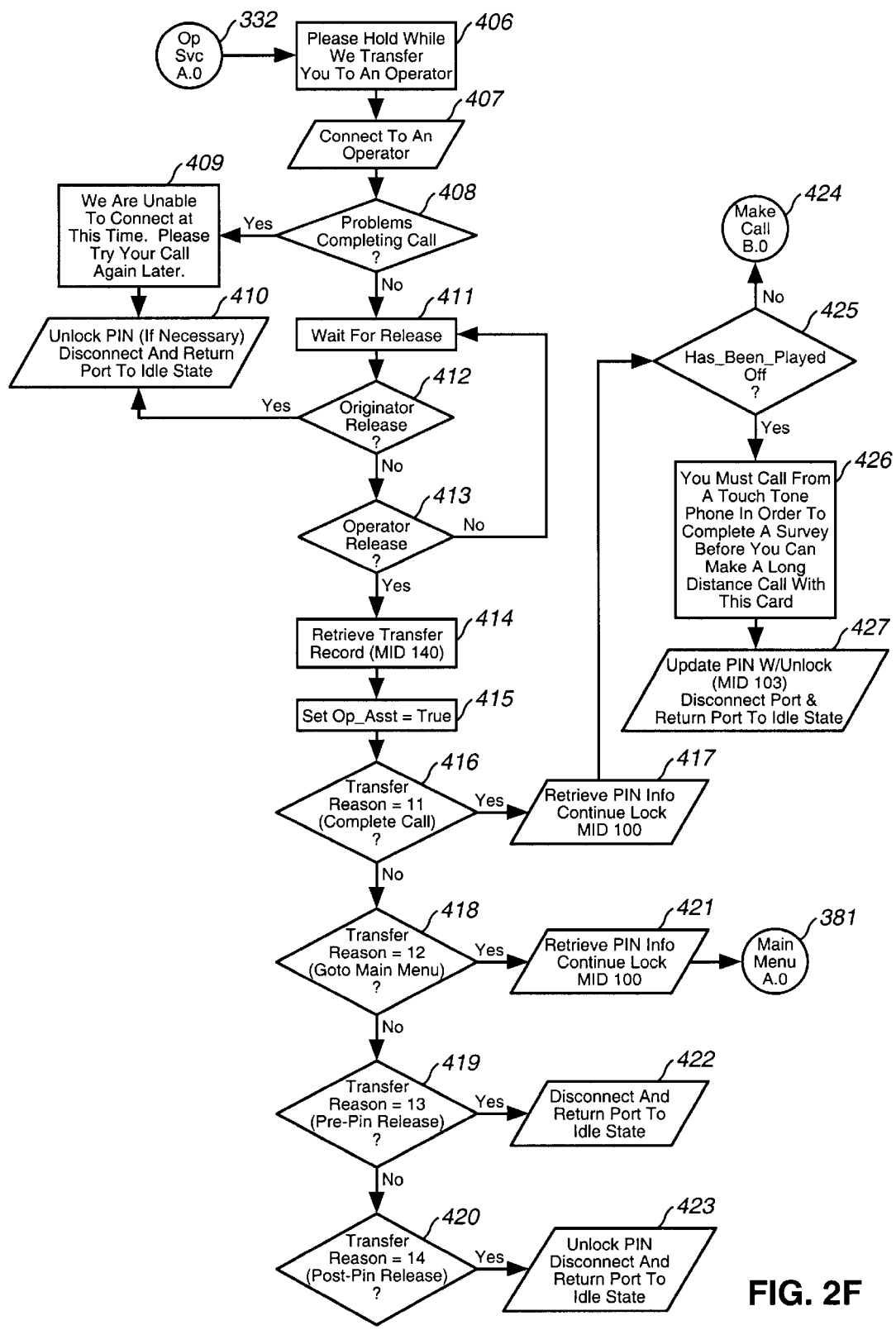
FIG. 2F is a continuation call flow diagram of the call flow diagram started in FIGS. 2A–2E.
Figure 2G:
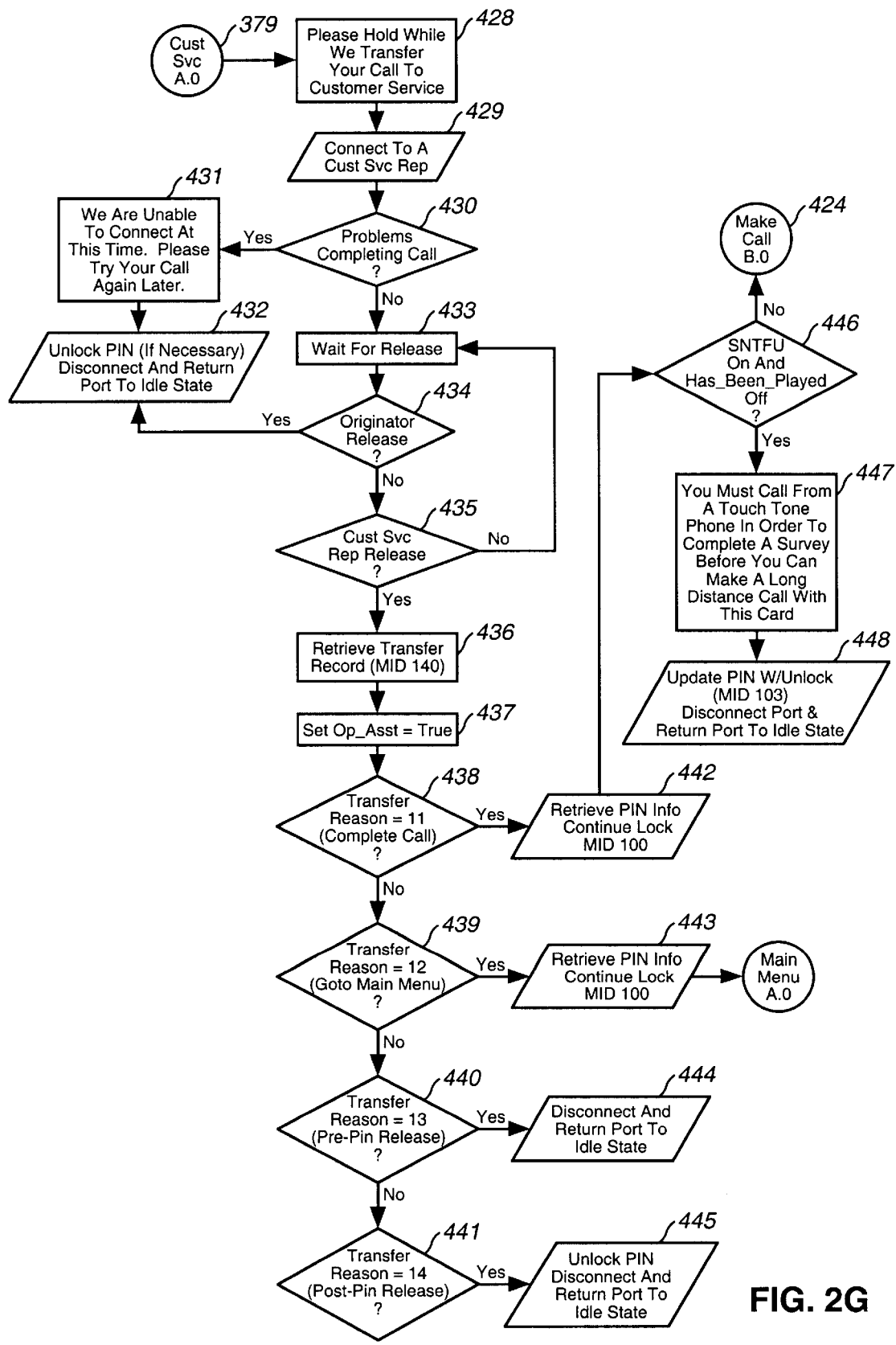
FIG. 2G is a continuation call flow diagram of the call flow diagram started in FIGS. 2A–2F.
Figure 2H:
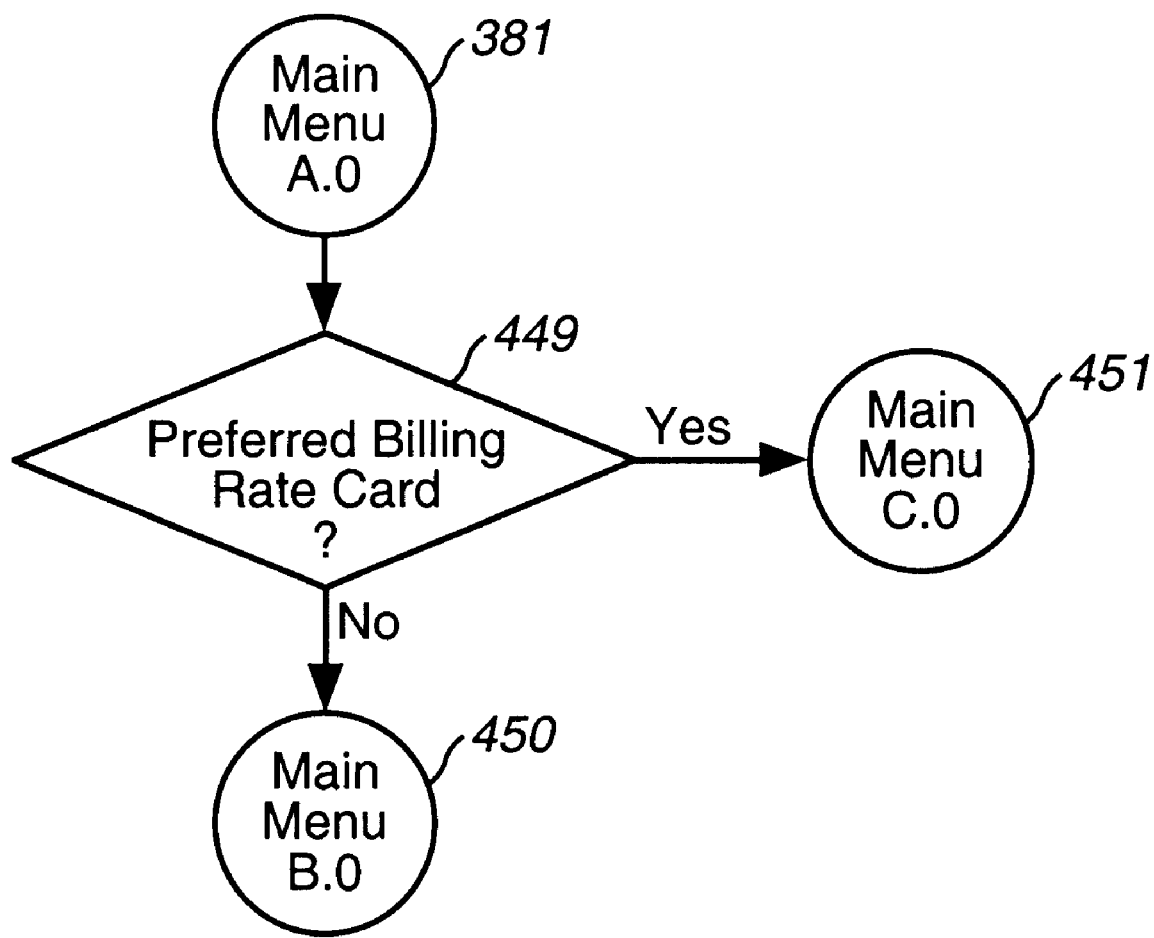
FIG. 2H is a continuation call flow diagram of the call flow diagram started in FIGS. 2A–2G.
Figure 2I:
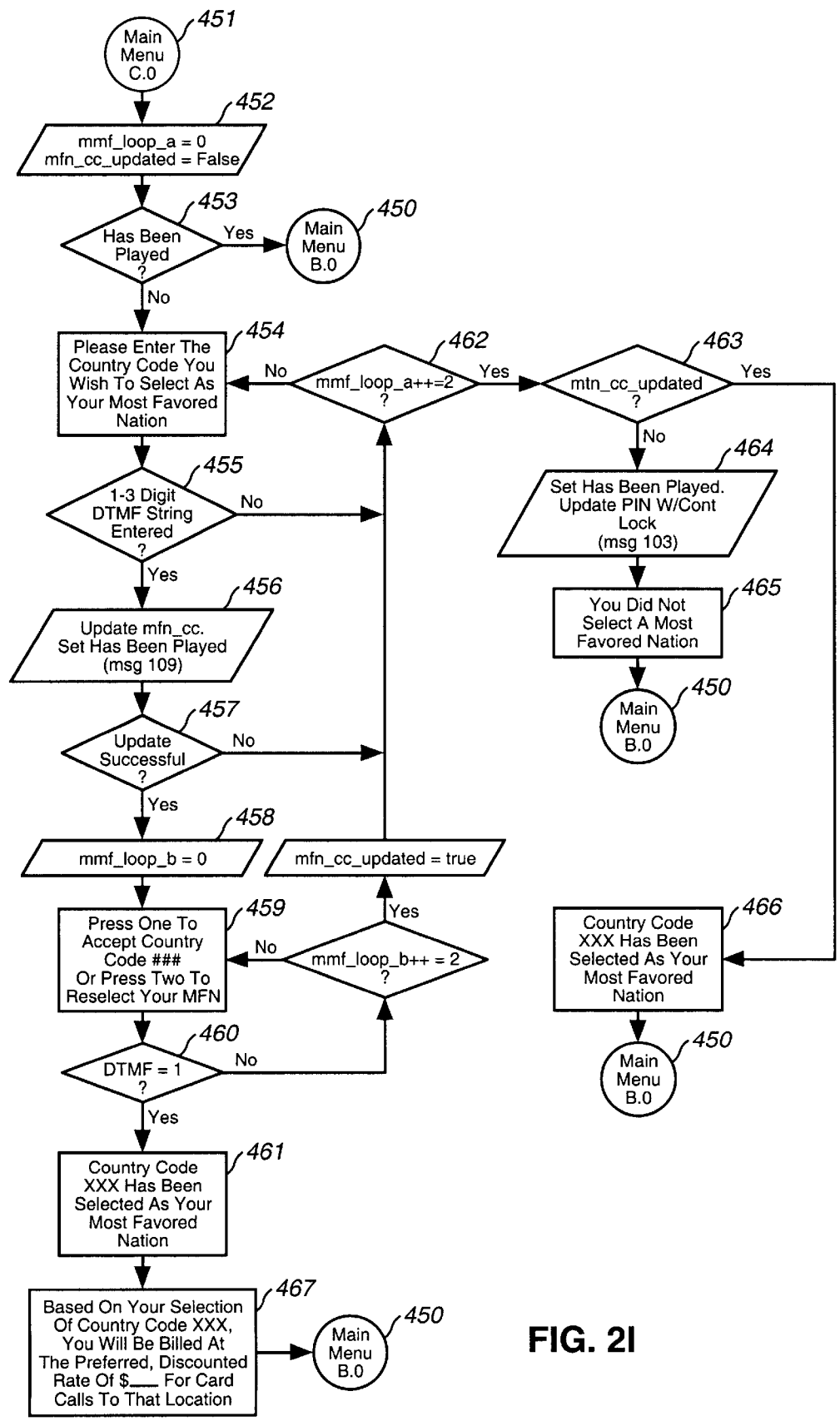
FIG. 2I is a continuation call flow diagram of the call flow diagram started in FIGS. 2A–2H.
Figure 2J:
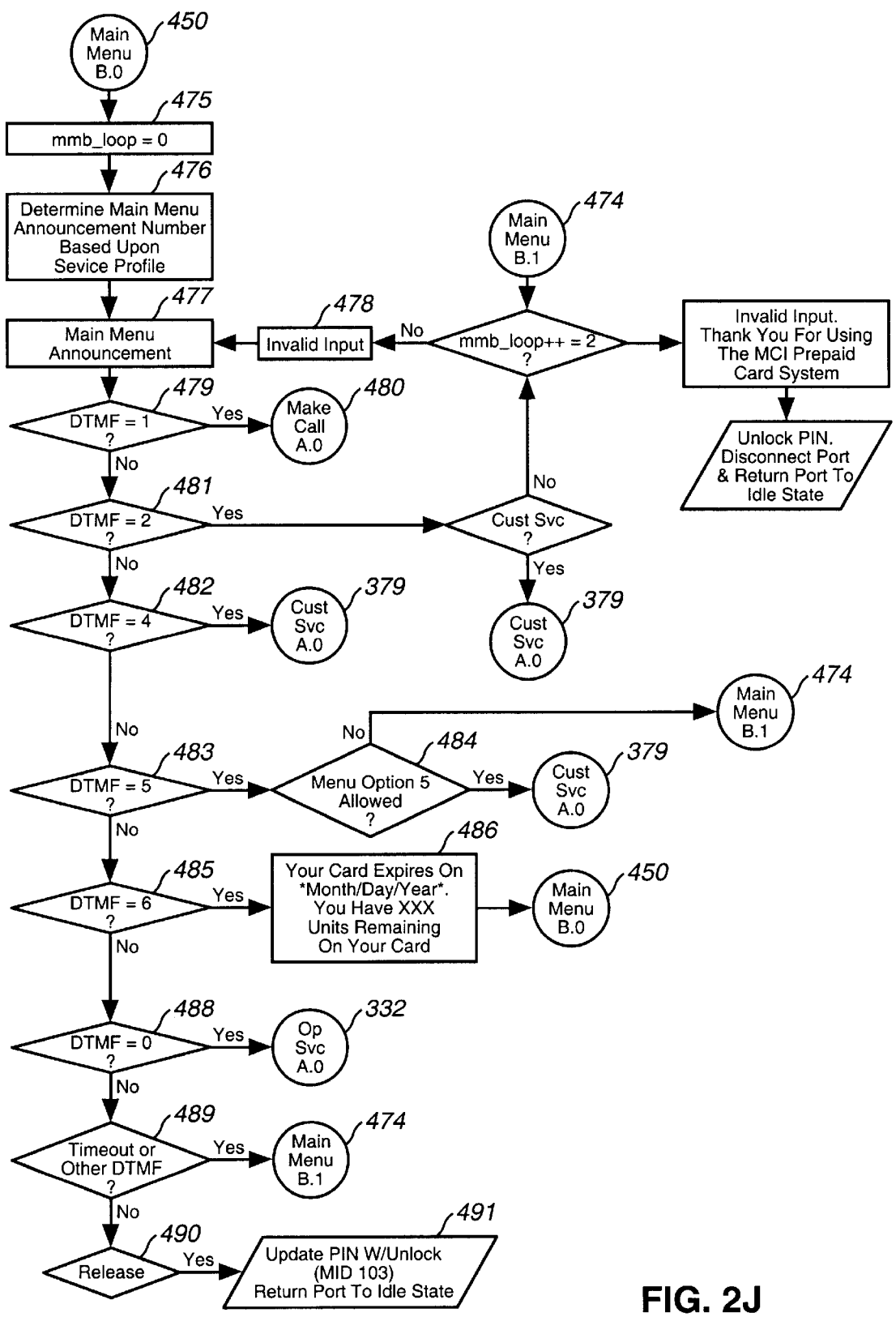
FIG. 2J is a continuation call flow diagram of the call flow diagram started in FIGS. 2A–2I.
Figure 2K:
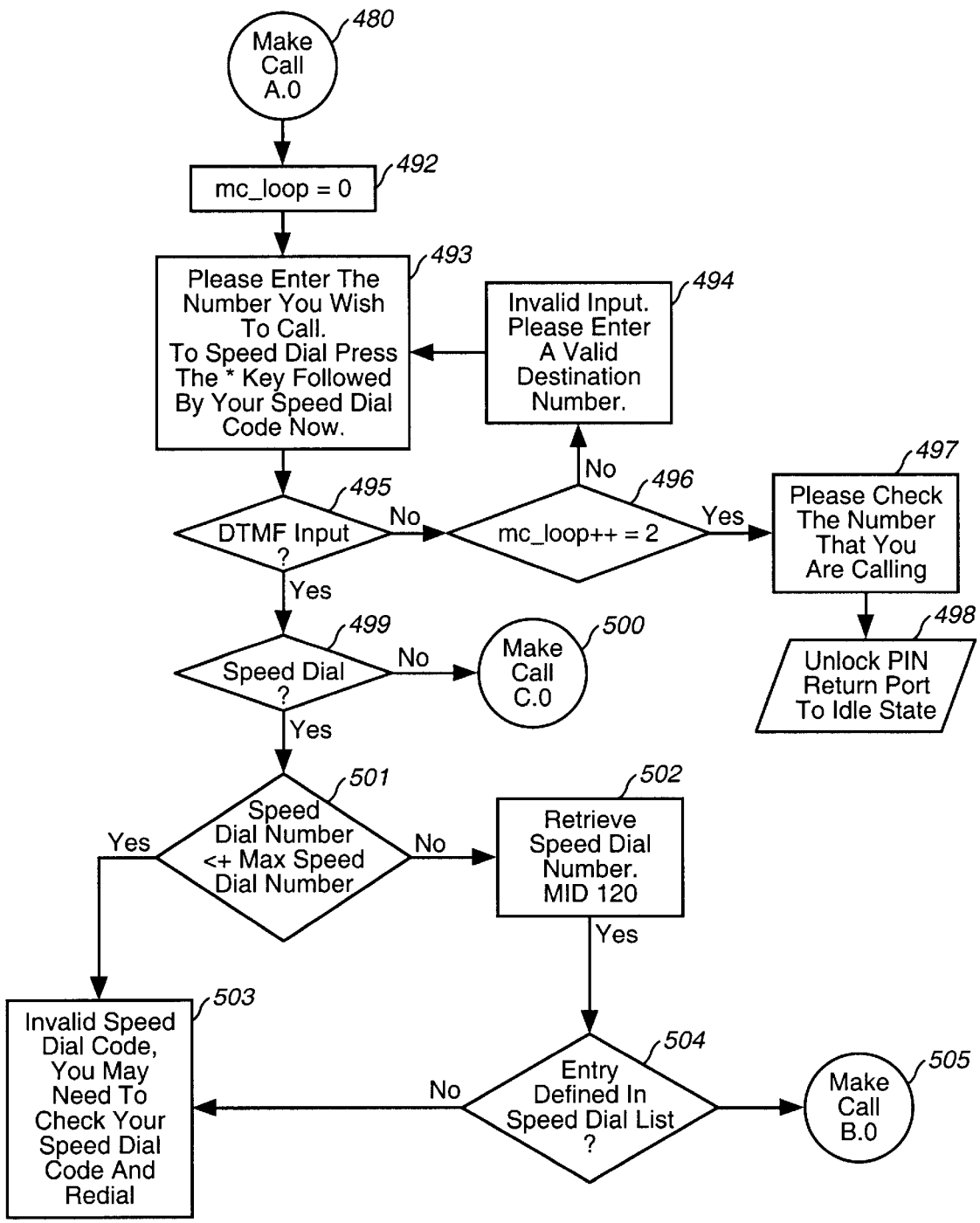
FIG. 2K is a continuation call flow diagram of the call flow diagram started in FIGS. 2A–2J.
Figure 2L:
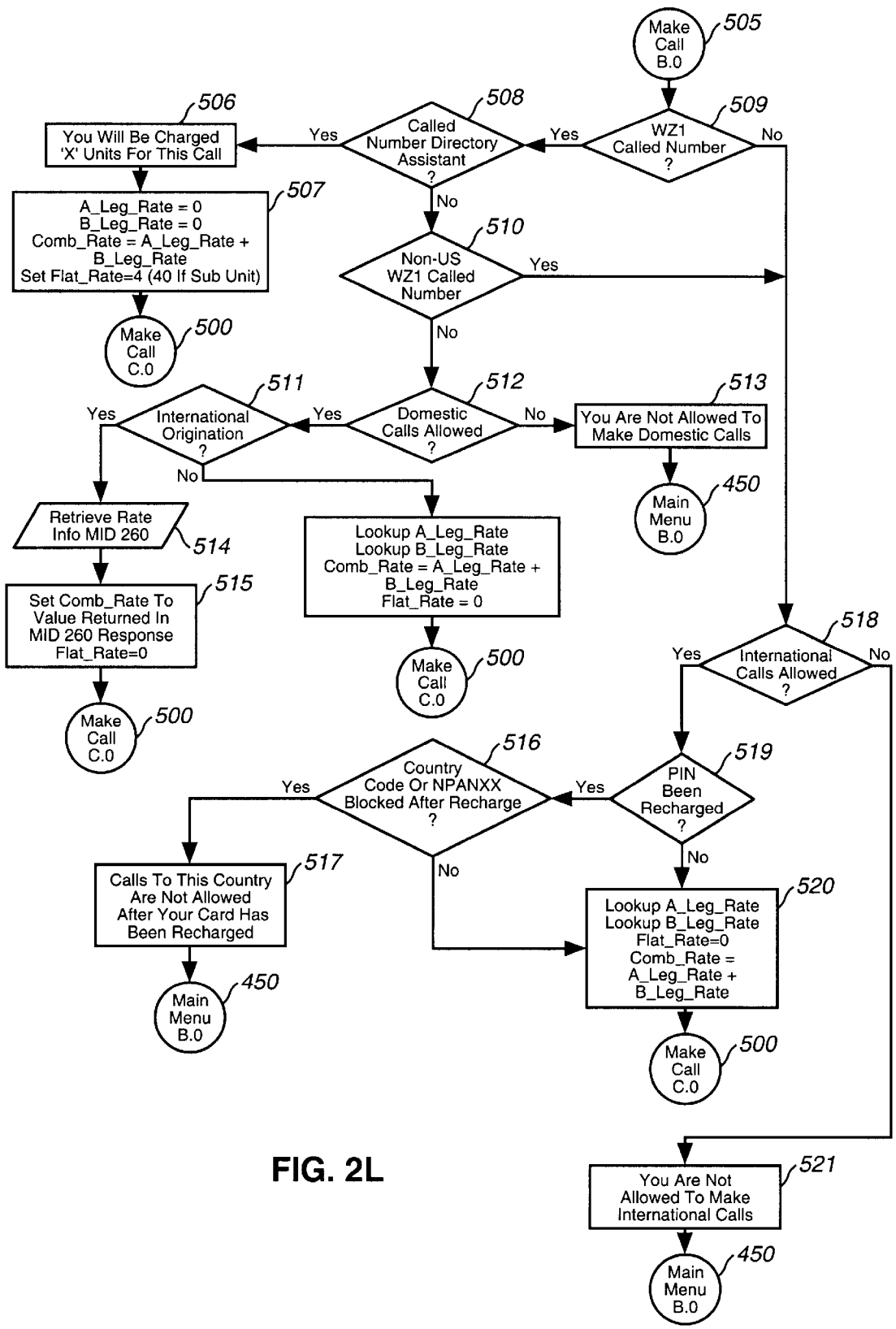
FIG. 2L is a continuation call flow diagram of the call flow diagram started in FIGS. 2A–2K.
Figure 2M:
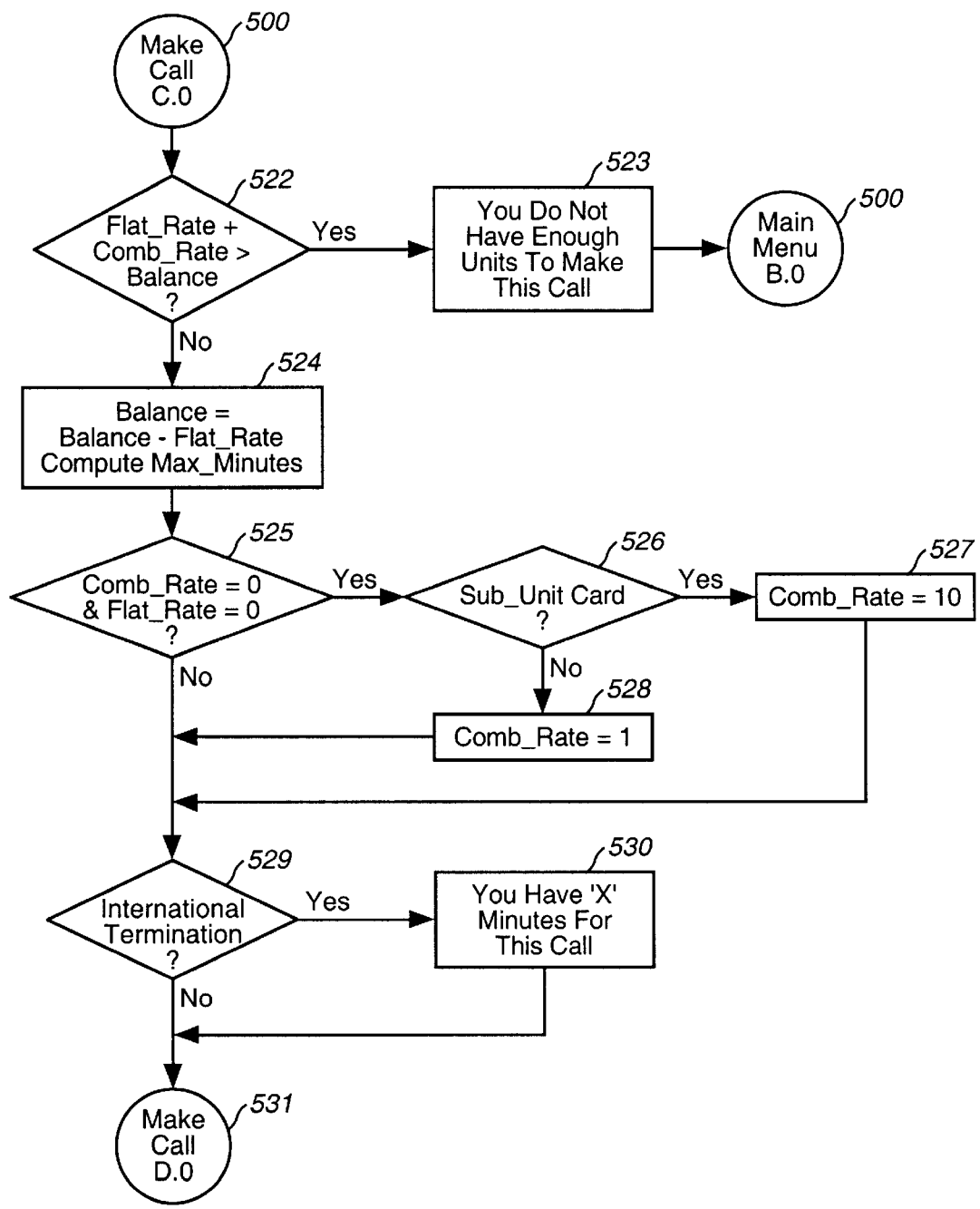
FIG. 2M is a continuation call flow diagram of the call flow diagram started in FIGS. 2A–2L.
Figure 2N:
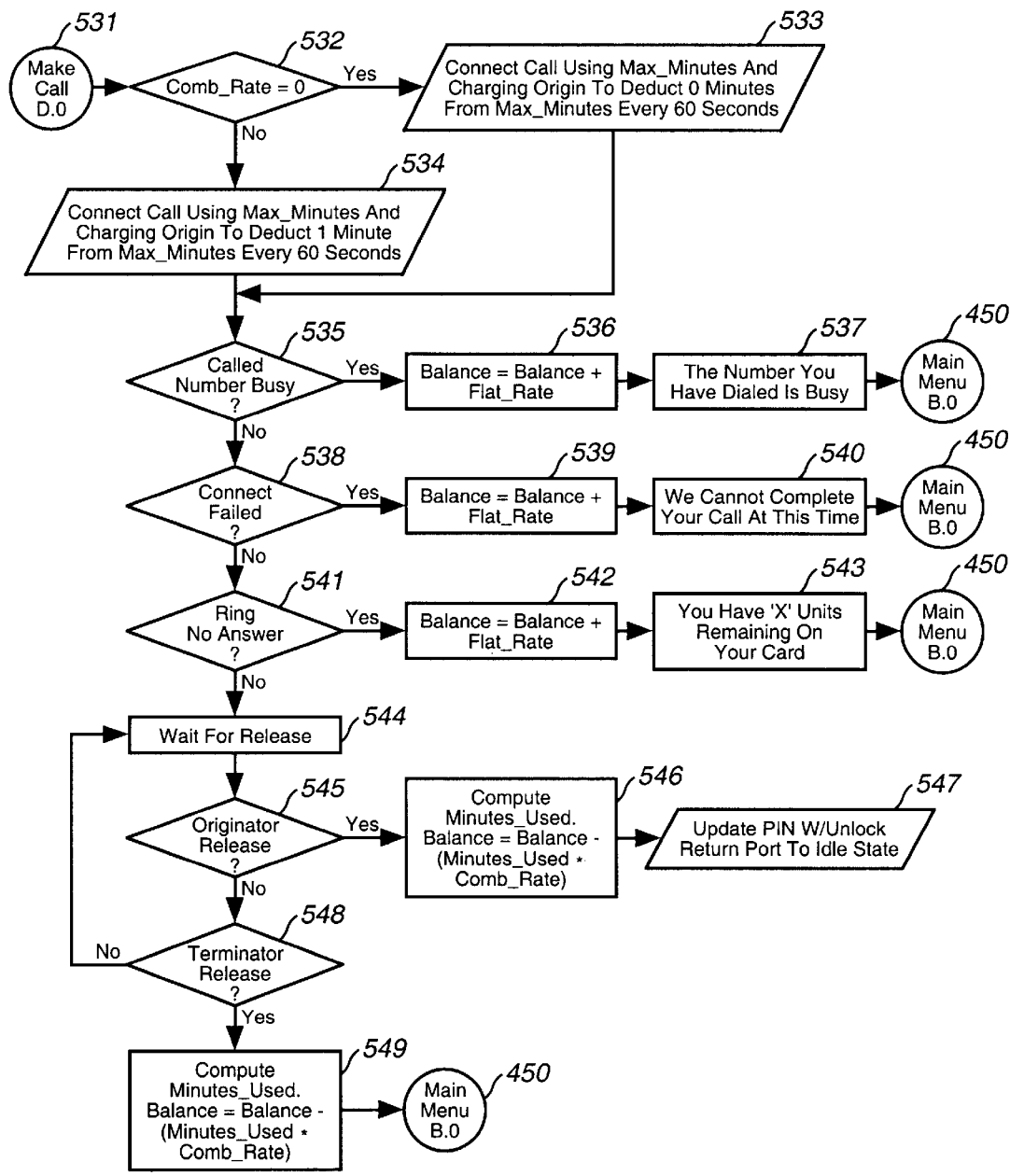
FIG. 2N is a continuation call flow diagram of the call flow diagram started in FIGS. 2A–2M.

The operations and call flows, within a system like or similar to system 100 (FIG. 1), to facilitate pre-paid card feature setup and card use are illustrated in FIGS. 2A–2N. Such operations are self-explanatory, but are discussed herein to further illustrate the novel aspects of the operations . It should be noted that shaded blocks within FIGS. 2A–2N are intended to illustrate exemplary automatic voice prompts, such as those that may be voiced automatically by voice response system 107. Accordingly, other prompts may be used as the present invention is not restricted to that shown in the attached figures and or described herein.

Referring now to FIG. 2A, depicted therein is a call flow diagram related to the use of a pre-paid card in accordance with a preferred embodiment of the present invention. FIG. 2A includes steps 301–332. The process steps depicted in steps 2A are self-explanatory and, accordingly, are discussed herein in summary. A calling party (e.g., a card user) dials a pre-paid card access number (e.g., a 1-800 access number) to access the pre-paid calling card processing system 104 via the PSTN 102. Based on the access number whence the calling party accesses pre-paid calling card system 104 at step 302, an appropriate language menu at step 303 may need to be provided to the calling party (e.g., for callers in foreign countries, for example). Otherwise, if the calling party is dialing an access number that corresponds to a domestic access number, processing proceeds as otherwise indicated in FIG. 2A and the calling party will be prompted with the various prompts illustrated therein and, in particular, to enter a pre-paid card/PIN number/identifier associated with his pre-paid card, etc.

If, at step 304, an alternative language is to be used to prompt a calling party in relation to his pre-paid card, processing will proceed to step 303 at the top of FIG. 2D and, in particular, to the steps within FIGS. 2D and 2E. FIGS. 2D and 2E include process steps 382–405 and are intended to illustrate exemplary operations to allow a calling party to select a particular language by which pre-paid telephone calling card processing system 104 will manifest audible voice prompts to a calling party (e.g., French prompts to a French-speaking card user, English prompts for an English-speaking card user, etc). Those skilled in the art will immediately understand the process steps illustrated in FIGS. 2D and 2E after careful inspection and review of the same. It should be noted, however, that there are references to operator services within FIG. 2D that are illustrated within FIG. 2F as discussed below.

After the calling party is prompted to enter his pre-paid card number (e.g., a 10 digit DTMF string corresponding to a PIN code/card identifier associated with his pre-paid calling card, etc.), processing will proceed at the top of FIG. 2B to verify the card number (PIN code associated with the pre-paid card) and to allow further processing.

If the ten digit DTMF string of digits entered by the calling party is an invalid string (e.g., one containing only symbols such as multiple "*" and "#" entered via a telephone key pad) and a release did not occur on the telephone call into pre-paid calling card processing system 104, operator service may be automatically initiated at step 331 and processing will then proceed at step 332 at the top of FIG. 2F. In FIG. 2F, process steps 406–427 are illustrated to exemplify operator assistance to a caller who has not entered an appropriate DTMF sequence/string that can correspond to a card number or PIN code associated with a pre-paid card as stored in SDP 106 (FIG. 1).

Depicted in FIG. 2B are process and call flow steps 314, 318, and 338–361. Such process and call flow steps are self-explanatory and accordingly, are discussed herein in summary. In FIG. 2B, the ten-digit PIN code entered by the calling party (also referred to above as the card number/identifier) are verified in relation to PIN data stored in SDP 106 as shown in FIG. 1. If the PIN code is an active PIN code indicating that the pre-paid card is valid and usable (although minutes/units may be depleted) then processing proceeds to step 341 at the top of FIG. 2C.

In FIG. 2C, process steps 362–381 are carried out to further validate the calling party's pre-paid card (e.g., pre-paid card 120). Additionally, the amount of remaining minutes left on the calling party's pre-paid card 120 will be analyzed at step 363 and the calling party will be correspondingly notified as to the balance at steps 364 and 380, respectively. If pre-paid card 120 contains remaining call usage units (e.g., minutes of long distance telephone service, available points, etc,), processing will then proceed at the top of FIG. 2H and, in particular, at step 381 illustrated therein.

It is important to note that the present invention will accommodate recharging and, in particular, recharge activation operations to cause an additional number of calling units to be associated with a particular pre-paid card, etc. Accordingly, if at step 364 the calling party is prompted that his pre-paid card has a zero unit balance, processing may proceed through to step 368, and to step 378 to reach customer service, for example, at step 379 as indicated at the top of FIG. 2G. In. FIG. 2G, process steps 428–448 illustrate the sequence of operations that may be carried out to have a live operator manually recharge the calling party's pre-paid card. Such recharge operations are, in actuality, database operations to adjust remaining unit counts or quantities and data stored within SDP 106 (FIG. 1), for example, which correspond to pre-paid 120. A discussion of such recharge operations may be found in co-pending U.S. patent applications Ser. No. 09/089,815 entitled "POINT OF SALE ACTIVATION AND DEACTIVATION OF PRE-PAID TELEPHONE CALLING CARDS," which is commonly assigned and incorporated herein by reference.

Referring now to FIG. 2H, depicted therein is a decisional call flow diagram related to determining weather pre-paid card 120 is a preferred billing rate pre-paid card. If pre-paid card 120 is such a card, processing proceeds to step 451 at the top of FIG. 2I. If not, processing proceeds to step 450 at the top of FIG. 2J.

Referring now to FIG. 2I, depicted therein is a call flow sequence for setting up at least one location identifier during an initial pre-paid telephone calling card call (e.g., a setup call to prepaid telephone calling card processing system 104). In particular, processing starts at step 451 and immediately proceeds to step 452. At step 452, internal loop control variables are initialized. Next, at step 453, it will be determined as to whether a location identifier setup prompt has been already played (e.g., automatically voiced by VRU 107, etc.). Such a setup prompt will be played during an initial setup call to allow a card purchaser to establish at least one location identifier to be used with prepaid card 120. If setup has already occurred (e.g., a location identifier has been established), then processing will proceed to set 450 as illustrated at the top of FIG. 2J.

If setup did not occur earlier, the calling party will be prompted to enter a location identifier such as a country code, a state code, a telephone number, etc. which he wishes to select as a location to be associated with preferred, discounted telephone service rates in accordance with the present invention. Such preferred, discounted rates may be displayed on packaging or other retail display material for pre-paid card 120. Alternatively, such preferred discounted rates may be printed on pre-paid card 120, voiced during the setup call, etc. to inform the card user of his ability to select a particular location to which he may make telephone calls and for which he may receive reduced service rates. Once established and stored within SDP 106, for example, downstream call detail billing systems can peruse or otherwise retrieve data within SDP 106, reference corresponding rate tables, and bill calls against available units for pre-paid card 120 based on telephone service rates that correspond to a card user's pre-selected location identifier(s).

At step 455, the calling party will enter a 1–3 digit string, for example, of characters corresponding to a location identifier (e.g., a geographic location identifier such as a country code, a state code, a place name, an address such as a telephone number, etc). At step 456, a has-been-played flag will be set to indicate that the set-up has occurred. Thereafter, storage of the calling party's location identifier(s) will be carried out such as via storage within SDP 106 (FIG. 1). At step 457, if such a storage procedure was successful, a looping variable will be initiated at step 458.

At step 459, the calling party will be prompted to press a telephone keypad button to indicate acceptance or to change his location identifier(s) during the setup call. If, at step 460, the calling party pressed the "1" key on his telephone keypad, processing proceeds to step 461.

At step 461, the calling party will be automatically prompted and notified that his location identifier has been selected as a location to which calls may be made in relation to prepaid card 120 and for which a discounted telephone service rate will be realized. Processing then proceeds to step 467 where the calling party will be prompted with the actual details of such billing for calls made in relation to prepaid card 120.

If, at step 455, a 1–3 digit DTMF string was not entered by the calling party, processing proceeds to step 462 where a looping construct will be evaluated for a particular condition. If that condition is satisfied, processing proceeds to step 463 where a determination will be made as to weather or not the location identifier was properly updated. If not, processing proceeds to step 464 where an appropriate has-been-played flag will be set appropriately and processing will then proceed to step 465 where the calling party will be prompted with an automatic notification that he has not selected a location identifier. Processing will then proceed to step 450 at the top of FIG. 2J.

If, at step 463 a location identifier has been updated within data stored within SDP 106 (FIG. 1) processing proceeds to step 466 where an automatic prompt will be manifested to the caller during the setup call to indicate and confirm that the location identifier has been specified and selected by the calling party.

Processing then proceeds at the top of FIG. 2J, and, in particular, at step 450 thereof.

Referring now to FIG. 2J, depicted therein is a call flow diagram that includes process steps 475–491. The purpose of such process steps are to prompt the card user with a main menu including announcements allowing corresponding DTMF entries to occur to either access a customer service, or place a call (e.g., a long distance pre-paid telephone calling card call, etc.) in accordance with remaining call units (e.g., minutes, etc.) related to pre-paid card 120 as stored in SDP 106, for example. At step 477, a main menu is voiced to the calling party (card user). If the calling party elects to make a call as indicated by pressing the "1" key on his DTMF telephone keypad, processing proceeds to step 480 as illustrated at the top of FIG. 2K. The remaining steps within FIG. 2K are self-explanatory and have been addressed with regard to FIGS. 2A–2J as discussed above.

Referring now to FIG. 2K, depicted therein is the start of a call flow which will allow a calling party (card user) to initiate an outbound call in relation to pre-paid card 120. That call flow is further illustrated in FIGS. 2M–2N and includes process steps 500–549. Such steps will be immediately apparent and understood by those skilled and knowledgeable in the art of pre-paid cards, after careful review of the process steps depicted therein.

Thus, having fully described the present invention by way of example with reference to attached drawing figures, it will be readily appreciated that many changes and modifications may be made to the invention and to any of the exemplary embodiments shown and/or described herein without departing from the spirit or scope of the invention, which is defined in the appended claims.

What is claimed is:

1. A system for facilitating the use of a preferred telephone rate for at least one location selected from substantially any location having public telephone service by a pre-paid telephone calling card, comprising:

a data storage system for storing data corresponding to a pre-paid telephone calling card and including at least one location identifier corresponding to said location selected from said locations having multiple discounted telephone call service rates for public telephone service, said at least one location identifier related to said pre-paid telephone calling card, and said at least one location identifier establishing a discounted telephone call service rate when calls chargeable to said pre-paid telephone card are made to said at least one location, said discounted telephone call service rate applying regardless of the location from which the call originates; and a pre-paid telephone calling card processing system coupled to said data storage system and configured to receive said at least one location identifier representative of said at least one selected location during an initial setup call over a telephone network and to cause said at least one location identifier to be stored in said data storage system during said setup call.

2. The system according to claim 1, wherein said data storage system and said pre-paid telephone calling card processing system are remotely located.

3. The system according to claim 1, wherein said data corresponding to said pre-paid telephone calling card includes a quantity corresponding to a number of service units available to be used to make at least one call in relation to said pre-paid telephone calling card.

4. The system according to claim 3, wherein said at least one call is a long distance telephone call.

5. The system according to claim 3, wherein said service units correspond to telephone call service minutes.

6. The system according to claim 1, wherein said pre-paid telephone calling card processing system causes said at least one location identifier representative of said selected location to be stored within said data storage system in accordance with a card identifier corresponding to said pre-paid telephone calling card.

7. The system according to claim 1, wherein said at least one location identifier is at least one country code corresponding to at least one country to which telephone calls may be made based on said at least one telephone call service rate.

8. The system according to claim 1, wherein said at least one location identifier is a two-digit string of characters.

9. The system according to claim 1, wherein said at least one location identifier is a three-digit string of characters.

10. The system according to claim 1, wherein said at least one location identifier is a telephone number spoken by a caller during said setup call.

11. A method for managing data associated with a pre-paid telephone calling card providing access to substantially any location having public telephone service, the method comprising the steps of:

receiving a geographic location identifier during an initial setup call over a telephone network, said geographic location identifier corresponding to selected locations of said locations having multiple discounted telephone call service rates for public telephone service to which telephone calls may be made at a discounted telephone call service rate which is different than the standard pre-paid telephone calling card service rate in place for the other locations having public telephone service, said discounted telephone call service rate applying regardless of the location from which the call originates; and storing said geographic location identifier in relation to data corresponding to the pre-paid telephone calling card.

12. The method according to claim 1, wherein said data corresponding to the pre-paid telephone calling card includes a quantity corresponding to a number of service units available to be used to make at least one call in relation to the pre-paid telephone calling card.

13. The method according to claim 12, wherein said service units correspond to telephone call service minutes.

14. A method of using a pre-paid telephone calling card to provide preferred service rates to at least one location selected from substantially any location having public telephone service, the method comprising the steps of:

accessing a pre-paid telephone calling card processing system during a pre-paid telephone calling card setup call via a telephone network;

entering a card identifier corresponding to data addressable by said pre-paid telephone calling card processing system;

entering a geographic location identifier corresponding to said at least one location selected from said locations having multiple discounted telephone call service rates for public telephone service to which telephone calls may be made at a discounted telephone call service rate, said discounted telephone call service rate providing a cost advantage to said at least one location over the remaining ones of said locations, said discounted telephone call service rate applying regardless of the location from which the call originates; and storing said geographic location identifier.

15. The method according to claim 14, wherein said telephone network is a publicly switched telephone network (PSTN).

16. A system for facilitating the use of a pre-paid telephone calling card having access to public telephone service, comprising;

a data storage system for storing data corresponding to a pre-paid telephone calling card including at least one location identifier representative of a selected location of said locations having multiple discounted telephone call service rates for public telephone service and corresponding to at least one telephone call service rate; and a pre-paid telephone calling card processing system coupled to said data storage system and configured to receive a request to make an outbound telephone call to said selected location represented by said at least one location identifier and chargeable to the pre-paid telephone calling card at a discounted rate over other ones of said locations having public telephone service during an access call over a telephone network, said discounted telephone call service rate applying regardless of the location from which the call originates.

17. The system according to claim 16, wherein said data storage system and said pre-paid calling card processing system are remotely located.

18. The system according to claim 16, wherein said data corresponding to the pre-paid telephone calling card includes a quantity corresponding to a number of service units available to be used to make at least one call in relation to the pre-paid telephone calling card.

19. The system according to claim 18, wherein said at least one call is a long distance telephone call.

20. The system according to claim 18, wherein said service units correspond to telephone call service minutes.

21. A method for facilitating the use of a pre-paid telephone calling card providing access to locations having public telephone service, the method comprising the steps of:

storing data corresponding to the pre-paid telephone calling card including a location identifier corresponding to selected location of said locations having multiple discounted telephone call service rates for public telephone service locations to which telephone calls can be made, said location identifier establishing a discounted telephone service rate; and receiving a request to make an outbound telephone call based on said location identifier and chargeable to said pre-paid telephone calling card at said discounted telephone service rate during an access call over a telephone network, said discounted telephone call service rate applying regardless of the location from which the call originates.

22. The method according to claim 21, wherein said data corresponding to the pre-paid telephone calling card includes a quantity corresponding to a number of service units available to be used to make said outbound telephone call in relation to the pre-paid telephone calling card.

23. The method according to claim 22, wherein said service units correspond to telephone call service minutes.

24. A method of using a pre-paid telephone calling card, the method comprising the steps of:

accessing a pre-paid telephone calling card processing system during a telephone service access call via a telephone network;

entering a card identifier corresponding to data addressable by said pre-paid telephone calling card processing system, said data addressable by said pre-paid telephone calling card processing system including a location identifier corresponding to a location of a plurality of locations having multiple discounted telephone call service rates for public telephone service to which telephone calls can be made, said location identifier corresponding to a discounted telephone service rate;

entering a terminating telephone number corresponding to said location identifier; and automatically initiating an outbound telephone call based on said terminating telephone number and causing said outbound telephone call to be billed at said discounted telephone service rate regardless of the location from which the call originates.

25. The method according to claim 24, wherein said location identifier is a country code.

26. The method according to claim 24, wherein said discount telephone service rate is less than a normally charged telephone service rate for calls made to a location corresponding to said location identifier.

* * * * *